United States Patent Office 3,024,968
Patented Mar. 13, 1962

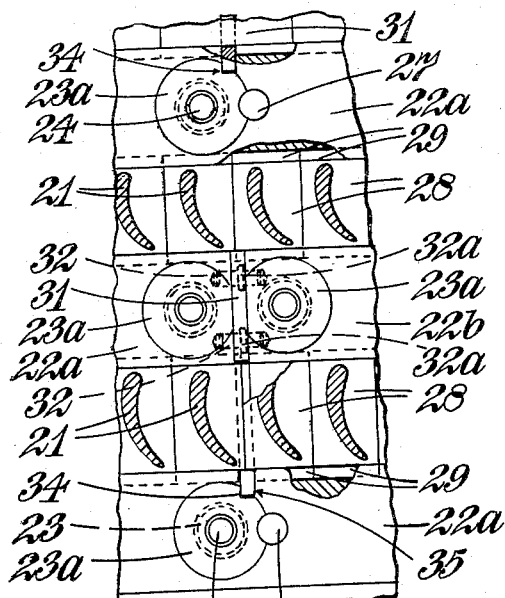
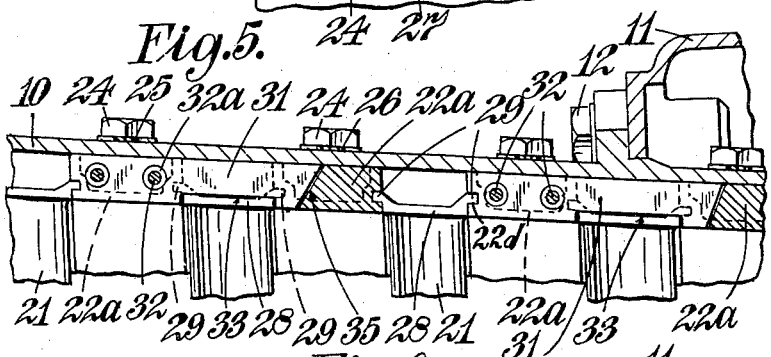
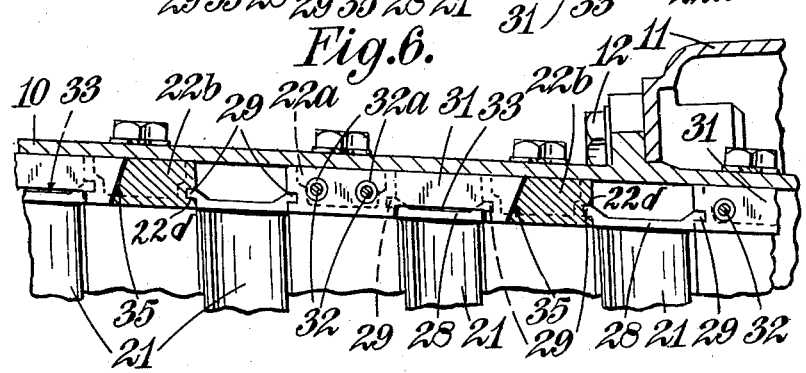

3,024,968
STATOR CONSTRUCTION FOR MULTI-STAGE
AXIAL-FLOW COMPRESSOR
Nigel Edward Payne, Burton-on-Trent, and Ernest Frank Sheldon, Ilkeston, England, assignors to Rolls-Royce Limited, Derby, England, a British company
Filed Oct. 8, 1956, Ser. No. 614,547
Claims priority, application Great Britain Oct. 21, 1955
2 Claims. (Cl. 230—133)

This invention relates to multi-stage axial-flow compressors, such for instance as are employed in gas-turbine engines.

In patent specification No. 2,645,413 (Rolls-Royce Limited), there is described and claimed a stator for a multi-stage axial-flow compressor comprising a tubular casing and a stator-blade assembly which includes circumferentially-disposed blades having blade platforms extending axially of the casing and circumferentially so that in assembly the platforms constitute a continuous circumferential ring at the roots of the blades, each of the axially spaced faces of the set of blade platforms engaging with an adjacent spacer ring to retain the blades axially spaced from one another, and the blade platforms interlocking with the spacer rings to retain the blades radially in position, and means for locating the assembly of rings and stator blades coaxially within the casing. In the form of axial-flow compressor shown, the casing is split diametrically and the spacer rings are formed in halves to permit the blade and ring assembly to be assembled in halves in the casing parts which are thereafter secured together. It is said moreover that the casing need not be split and that in this case the spacer rings may be of continuous circular form. The means described for locating the blade and ring assembly in the casing comprises an axial abutment on the casing for one end of the assembly and means cooperating with the opposite end of the assembly to load it axially against the abutment.

This invention has for an object to provide a construction of stator for a multi-stage axial-flow compressor in which clearances between the stator blades and the rotor blading are accurately maintained.

According to the present invention, a stator for a multi-stage axial-flow compressor comprises a tubular unsplit casing and within the casing an assembly of axially-spaced rows of stator blades and spacer rings between the rows of blades, which blades have at their root ends axially- and circumferentially-extending platforms interlocking at their axially-spaced edges with the spacer rings to retain the blades radially in position, each of which spacer rings being made in a plurality of part-circular sections and each part-circular section being individually secured in position in the casing.

In constructions according to the present invention it is preferred to intercalate rows of stator blades engaged at their root ends with the associated spacer rings with the rotor blades of an assembled rotor; thereafter the tubular casing is slid over the assembly and the spacer rings are secured to the casing by fixing means inserted from the exterior of the casing. It will be appreciated, however, that the compressor can be built up by introducing alternate stages of rotor and stator blading in sequence into the casing, the rotor blade support discs being secured one to another to produce a rotor assembly, whilst the stator blades are secured to the stator casing through the associated spacer rings.

Since the sections of each spacer ring are individually located, the clearances between the stator blades supported by the spacer rings and the adjacent rotor blading are accurately maintained.

The sections of the spacer rings may be secured to the casing by setscrews, passing through the casing to engage the sections; where the latter are light alloy material it may be desirable to provide insert bushings which are engaged by the setscrews. Alternatively, if the spacer rings are of steel such insert bushings may be omitted. The sections of each spacer ring are preferably angularly staggered with respect to those of the adjacent spacer rings, and strips are supported between the ends of the sections to extend axially into engagement with a notch in the adjacent spacer ring on one side. The strips serve to prevent angular displacement of the blades supported between the rings, and also to prevent disengagement of insert bushings which may be threaded into the ring sections.

One construction of stator for an axial-flow compressor is illustrated in the accompanying drawings, in which:

FIGURE 4 is a view in the direction of arrow IV on FIGURE 3,

FIGURE 5 is a section on the line V—V of FIGURE 2, and

FIGURE 6 is a section on the line VI—VI of FIGURE 2.

Figure 1:
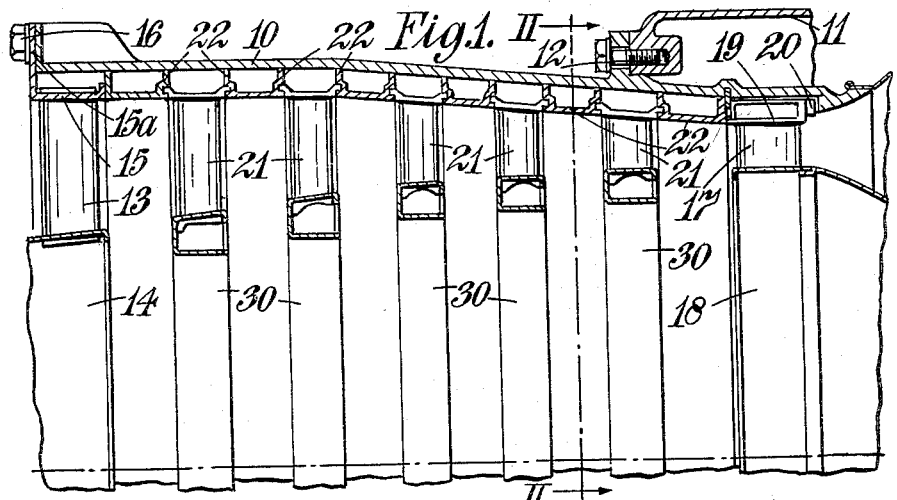
FIGURE 1 is an axial section through part of the compressor.
Figure 2:
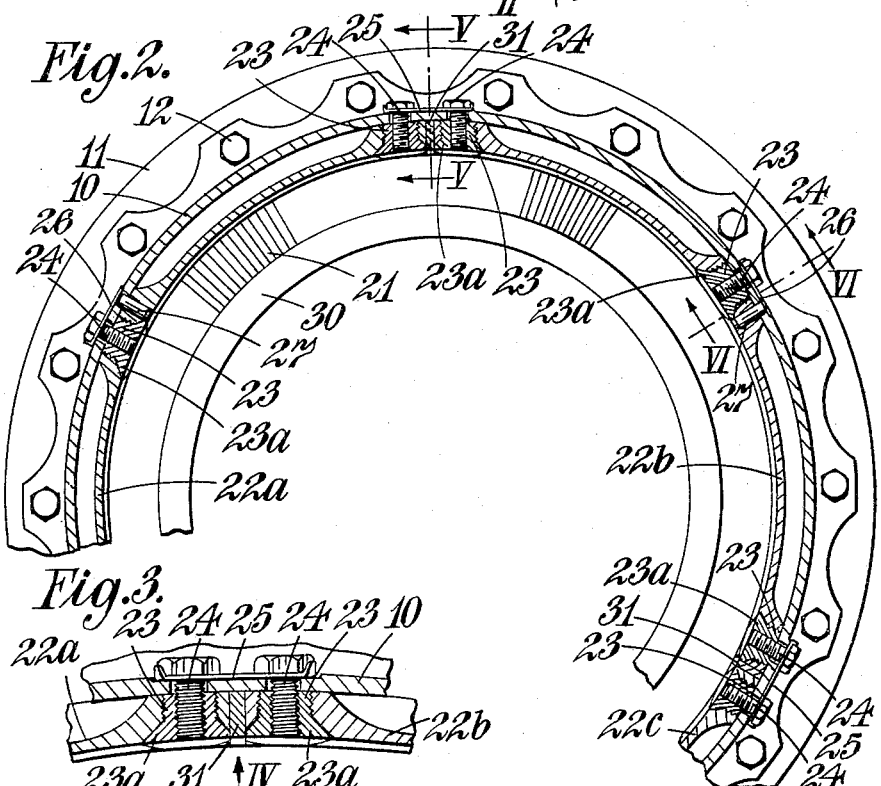
FIGURE 2 is a section on the line II—II of FIGURE 1.
Figure 3:
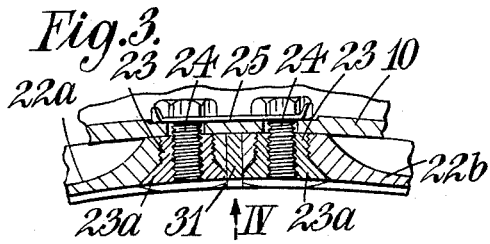
FIGURE 3 shows part of FIGURE 2 to a larger scale.

Referring first to FIGURE 1, the stator comprises a casing of full circular section, that is it is unsplit diametrically, and it is formed in two axially-abutting parts 10, 11. The upstream part 10 is secured to the downstream part 11 by studs 12.

The stator also comprises fixed inlet guide vanes 13 which support at their inner ends an inlet fairing 14 and are supported at their outer ends in a ring 15 having a flange 15a secured by studs 16 to a bolting flange at the upstream end of the part 10 of the casing.

The compressor stator also comprises a ring of outlet guide vanes 17 which are mounted in an annular member 18 by their inner ends and which are supported within the compressor casing part 11 through platforms 19 at their outer ends, the platforms being provided with radial dogs 20 which co-operate with corresponding dogs on the casing part 10.

Between the inlet guide vanes 13 and outlet guide vanes 17, there are a number of rows of stator blades 21, the rows being held in position in the casing and in axially-spaced relation with respect to one another through spacer rings 22.

Referring now to FIGURES 2 to 6, it will be seen that each spacer ring 22 is formed in three part-circular sections 22a, 22b, 22c and that each of these sections is individually mounted in position in the compressor casing.

Each of the sections 22a, 22b, 22c which may be of light alloy material, is generally of channel cross-section and has thickened portions at each end and at its mid length, which thickened portions have threaded into them bushings 23 with conically-flanged heads 23a. The bushings 23 have threaded bores to receive retaining setscrews 24 which pass through the casing. The flanged heads 23a of the bushings in the ends of the sections are of such dimension as to extend to the end of the sections where they are each provided with a flat surface flush with the end of the section (see FIGURE 3). The setscrews 24 engaged in the bushings 23 at the ends of the sections are retained against rotation by double tab washers 25 and the setscrews 24 which engage the bushings 23 at the centers of the sections are held against rotation by tab washers 26, each of which carries a peg 27 which is received in aligned holes in the casing and in the spacer ring section. The sections 22a, 22b, 22c of each of the spacer rings 22 are angularly staggered with respect to the sections of the spacer rings on each side of it so that the gaps between the ends of the sections of each spacer ring are aligned axially with the thickened center portion of the spacer rings on each side of it.

Each of the stator blades 21 has at its radially outer end an axially- and circumferentially-extending blade platform 28, the axially-spaced edges of which have flanges 29 engaging with peripheral grooves 22d in the axially-facing surfaces of the spacer rings 22. The blades 21 are thus retained radially and axially in position. The radially inner ends of the blades in the construction illustrated pass through slots in and are brazed or welded to continuous channel-section rings 30 (see FIGURE 1).

In order to retain the blades 21 circumferentially in position, retainer strips 31 are provided. These retainer strips are supported at one end between adjacent ends of the spacer ring sections by pairs of dowel pegs 32 (FIGURES 4 to 6) which project into holes in the adjacent ends of the sections and are provided with peripheral flanges 32a to be received in recesses in the retainer strips 31. Each retainer strip 31 extends axially of the casing from the spacer ring 22 by which it is supported to engage by its other end in a notch 35 in the next adjacent spacer ring on one side of the spacer ring from which the strip is supported. The radially-inner edges of the retainer strips lie flush with the radially-inner surfaces of the spacer rings 22 but are cutaway as indicated at 33 in FIGURES 5 and 6 to pass over the blade platforms 28. The blades adjacent the retainer strips 31 have the flanges 29 at the axially-spaced edges of their platforms cut back to allow the strips to pass between the edges, so that the retainer strips afford circumferential abutments preventing circumferential displacement of the blades.

The retainer strips 31 also serve to prevent rotation of the bushings 23 by engagement with the flats on the flanged heads 23a of the bushes at the ends of the spacer ring sections and by engagement in notches as indicated at 34 in the flanges 23a of the bushings at the mid length of the spacer ring sections (see FIGURE 4).

It will be seen that since each of the spacer ring sections is individually located within the casing of the compressor, the stator blades supported by the spacer rings may have an accurately controlled clearance from the rotor blading of the compressor.

We claim:

1. A stator for a multi-stage axial-flow compressor comprising a tubular unsplit casing, a plurality of axially-spaced rows of stator blade members within the casing, each of the stator blade members having at its end adjacent the casing an axially and circumferentially-extending platform, the platforms of each row of blade members together forming an annulus, and means supporting the blade members in position in the casing with their platforms in radially spaced relation thereto and holding the rows of blade members in axially-spaced relation comprising a plurality of spacer ring members said spacer rings having axial notches, the spacer ring members and the annuli formed by the platforms of the rows of blade members alternating axially of the casing so that there is a spacer ring member engaged between each pair of adjacent rows of blade members, certain of said members at the zones of engagement having an axially extending interlocking feature interengaged with its companion of said members to retain the blade members in position, each spacer ring member comprising a plurality of part-circular sections, said part circular sections each having terminal ends extending radially outward into contact with the casing, the part circular sections of each spacer ring member being angularly staggered with respect to the part-circular sections of each adjacent spacer ring member, and means engaging both the radially extending portions of the part-circular sections and the casing and securing each of the part-circular sections individually to the casing comprising set screws extending through the casing and having threaded engagement with the part-circular section, and retainer strips, each retainer strip being supported at one end between the adjacent ends of a pair of part-circular sections of a spacer ring member and extending axially from the spacer ring member between the platforms of a pair of blades, the next adjacent spacer ring member having a peripheral notch engaged by said retainer strip, whereby the blade members are restrained against circumferential displacement.

2. A stator as claimed in claim 1, wherein the part-circular sections have threaded bushings secured in them to receive the setscrew means, and, wherein the retainer strips also engage the bushings and hold them against rotation.

References Cited in the file of this patent

UNITED STATES PATENTS

| | | |
|---|---|---|
| 2,510,606 | Price | June 6, 1950 |
| 2,722,373 | Ledwith et al. | Nov. 1, 1955 |
| 2,749,026 | Hasbrouck et al. | June 5, 1956 |
| 2,763,462 | McDowall et al. | Sept. 18, 1956 |
| 2,833,463 | Worley | May 6, 1958 |
| 2,959,394 | Halford et al. | Nov. 8, 1960 |

FOREIGN PATENTS

| | | |
|---|---|---|
| 146,061 | Sweden | July 6, 1954 |
| 586,564 | Great Britain | Mar. 24, 1947 |
| 621,544 | Great Britain | Apr. 11, 1949 |
| 622,895 | Great Britain | May 9, 1949 |
| 741,549 | Great Britain | Dec. 7, 1955 |